(Model.)

J. SAGER.
GRAPE SHEARS.

No. 257,389. Patented May 2, 1882.

WITNESSES:

INVENTOR:
J. Sager
BY
ATTORNEYS.

UNITED STATES PATENT OFFICE.

JOHN SAGER, OF THAMESVILLE, ONTARIO, CANADA, ASSIGNOR TO HIMSELF AND EPHRAIM SANFORD, OF SAME PLACE.

GRAPE-SHEARS.

SPECIFICATION forming part of Letters Patent No. 257,389, dated May 2, 1882.

Application filed August 22, 1881. (Model.)

*To all whom it may concern:*

Be it known that I, JOHN SAGER, of Thamesville, in the Province of Ontario, Dominion of Canada, have invented a new and Improved Grape-Shears, of which the following is a specification.

Shears constructed with special reference to adaptation for cutting or picking grapes and flowers have been provided with various forms of elastic clamping devices for grasping the stems of the same, so that they may be held suspended after being cut. My invention is an improvement in this line, and is more especially an improvement upon the "pruning-shears" forming the subject of Letters Patent No. 119,452, in which metal clamps pivoted together at the same point as the cutting-blades are provided with rear extensions, whose extremities are attached to the shanks of said blades. Thus the said clamps are operated simultaneously with the shears or cutting-blades, so as to grasp and firmly hold the stem of grape or flower the instant it is severed. In my invention I adopt such construction and arrangement of parts that I am enabled to dispense with one of the clamping devices employed in the implement above referred to, and also avoid a serious defect in the operation of the latter, as hereinafter set forth.

I will proceed to describe my invention by reference to accompanying drawings, in which—

Figure 1:
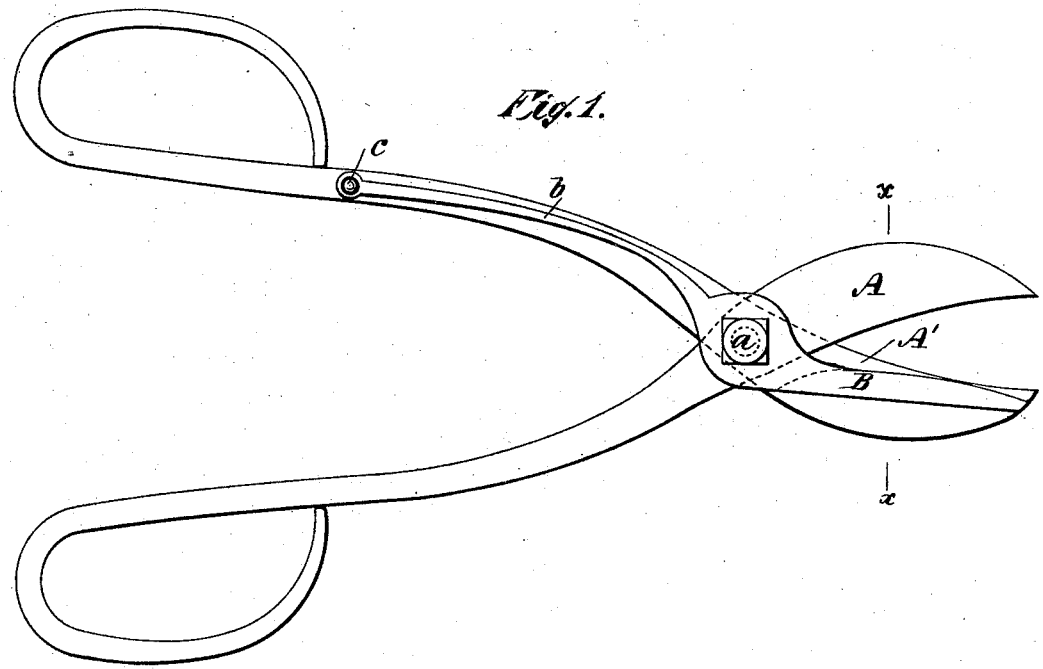
Figure 2:
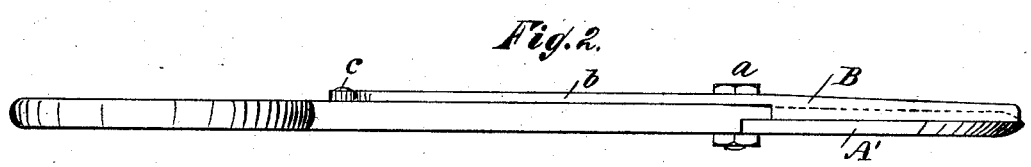
Figure 3:
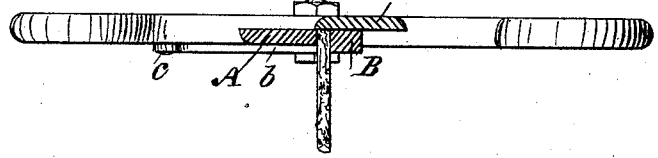

Figure 1 is a side elevation of my improved shears. Fig. 2 is an edge view of the same. Fig. 3 is a cross-section taken on line *x x* of Fig. 1, the jaws being represented as they appear just after the bunch of grapes or flower has been cut.

Similar letters of reference indicate corresponding parts.

The jaws A A' of the shears are preferably made concave on their cutting-edges, as shown. Upon the pivot *a*, which joins the parts of the shears together, is placed the finger B, which extends along and a little below the cutting-edge of the jaw A', as shown in Fig. 1. This finger is formed with the spring-extension *b*, which extends along the arm of the jaw A', and is riveted thereto, as shown at *c*. It will be observed that the finger is secured upon the bolt *a* outside of the jaw A; and in order that the inner face of the finger shall rest flat against the jaw A', so that the jaw A will, when the jaws are closed, come against the finger, this portion is made thicker than the spring portion and the other parts of the finger, as shown in Figs. 2 and 3. The edge of jaw A is flat, instead of being beveled like jaw A', and thus conforms to the surface of the finger on which it presses when the jaws are closed. When the shears are thus constructed the bunch of grapes or the stem of the flower, after being severed from the vine or plant, will be firmly held between the edges of the jaw A and the finger B, as shown in Fig. 3. The blade A thus performs an additional function, in that it coacts with the finger B to form the clamping device. The spring-extension of the finger, being rigidly attached at *c* to the shank of the blade A, therefore rigidly supports the pivot *a* and opposes the strain incident to the action of the clamping devices A B. The pivot *a* is not therefore liable to be bent or become loose, and the blades A A' are held in close working contact, so that the implement not only operates better, but is more durable. It may be added that the finger with its spring is so arranged relatively to the cutting-edges of the shears that the twig is practically severed from the vine or plant before it is clamped between the jaw A and the finger, so that no additional power for cutting the twig is required in consequence of the finger. In this respect, as well as others, my invention is advantageously distinguished from the implement forming the subject of Patent No. 119,452, for in the latter the spring-clamps begin to press on the twig or stem simultaneously with the commencement of the cut made by the blades or jaws, so that much greater force (pressure) is obviously required to operate the implement than to operate mine, in which latter there is no pressure applied by the clamp until the cut of the blades has been completed, or nearly so.

I do not claim broadly a pruning implement of this class in which one of the blades serves as part of a clamping device for grasping the stem of a flower or grape-bunch.

What I do claim as new is—

In an implement for use in gathering grapes, the combination, with the jaws or blades A A', one having a beveled and the other a flat edge, of the flat finger B, attached to the jaw-pivot $a$, and lying close alongside the jaw A', and having a spring-extension which is attached to the shank of said jaw, as set forth.

JOHN SAGER.

Witnesses:
JAMES GRAVES,
J. M. CARTHEW.